(12) United States Patent
Anderson et al.

(10) Patent No.: US 6,765,644 B1
(45) Date of Patent: Jul. 20, 2004

(54) BROADBAND OPTICAL BEAM STEERING SYSTEM AND METHOD

(75) Inventors: J. Steve Anderson, Santa Monica, CA (US); Michael Y. Pines, Los Angeles, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 09/516,812

(22) Filed: Mar. 1, 2000

(51) Int. Cl.$^7$ .................................................. G02F 1/13
(52) U.S. Cl. ..................... 349/196; 359/316; 250/201.9; 250/227.14
(58) Field of Search ................................ 349/196, 201, 349/202; 359/16, 17, 211, 315, 316, 288; 250/201.9, 227.14; 356/141

(56) References Cited

U.S. PATENT DOCUMENTS

| | | | | |
|---|---|---|---|---|
| 3,658,424 A | * | 4/1972 | Elliott | 356/305 |
| 3,900,263 A | * | 8/1975 | Hall, Jr. | 356/300 |
| 4,131,021 A | * | 12/1978 | Mezrich et al. | 73/606 |
| 4,639,091 A | * | 1/1987 | Huignard et al. | 349/202 |
| 4,930,853 A | * | 6/1990 | Grego | 359/315 |
| 4,963,900 A | * | 10/1990 | Budd et al. | 347/137 |
| 4,971,413 A | * | 11/1990 | Inoue | 250/236 |
| 4,972,112 A | * | 11/1990 | Kim | 310/180 |
| 5,093,747 A | * | 3/1992 | Dorschner | 359/316 |
| 5,126,869 A | | 6/1992 | Lipchak et al. | |
| 5,151,814 A | * | 9/1992 | Grinberg et al. | 349/202 |
| 5,253,033 A | * | 10/1993 | Lipchak et al. | 356/4.01 |
| 5,363,126 A | * | 11/1994 | Andrews | 347/134 |
| 5,448,403 A | * | 9/1995 | Harris | 359/18 |
| 5,596,430 A | * | 1/1997 | Hasegawa et al. | 349/74 |
| 5,615,029 A | * | 3/1997 | Moddel et al. | 349/84 |
| 5,625,499 A | * | 4/1997 | Chen | 359/569 |
| 5,825,523 A | * | 10/1998 | Amitai | 359/209 |
| 5,986,778 A | * | 11/1999 | Kramer | 359/16 |
| 6,169,594 B1 | * | 1/2001 | Aye et al. | 349/196 |
| 6,344,937 B1 | * | 2/2002 | Sparrold et al. | 359/211 |

* cited by examiner

*Primary Examiner*—Kenneth Parker
(74) *Attorney, Agent, or Firm*—John E. Gunther; Leonard A. Alkov; William C. Schubert

(57) ABSTRACT

A small, compact optical scanning system with small aperture size requirements, wide field-of-regard and minimal color dispersion characteristics. The inventive scanning system and method provides for optical beam steering over a broad spectral band and over a wide field-of-regard. The inventive system includes a novel device for receiving an input wavefront of electromagnetic energy along a first axis and refracting the wavefront as an output wavefront along a second axis. The device is a unique form of a liquid crystal array which can be electrically manipulated to change the effective refractive index of each pixel. The index of refraction of the device varies in response to an applied voltage. The voltage is supplied by a microprocessor and/or a servo-control system. By changing the index, the incident phase front can be steered at an angle with respect to the first axis and otherwise manipulated according to the index variant pattern induced in the array. Accordingly, the output beam is steered in response to the applied voltage.

11 Claims, 4 Drawing Sheets

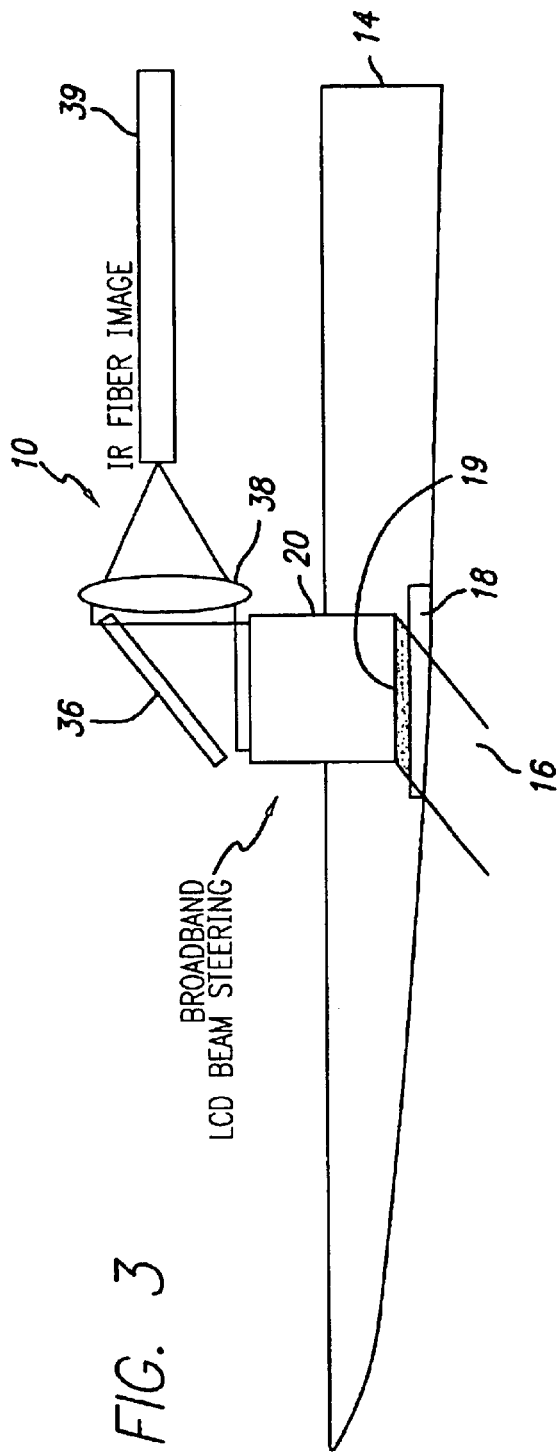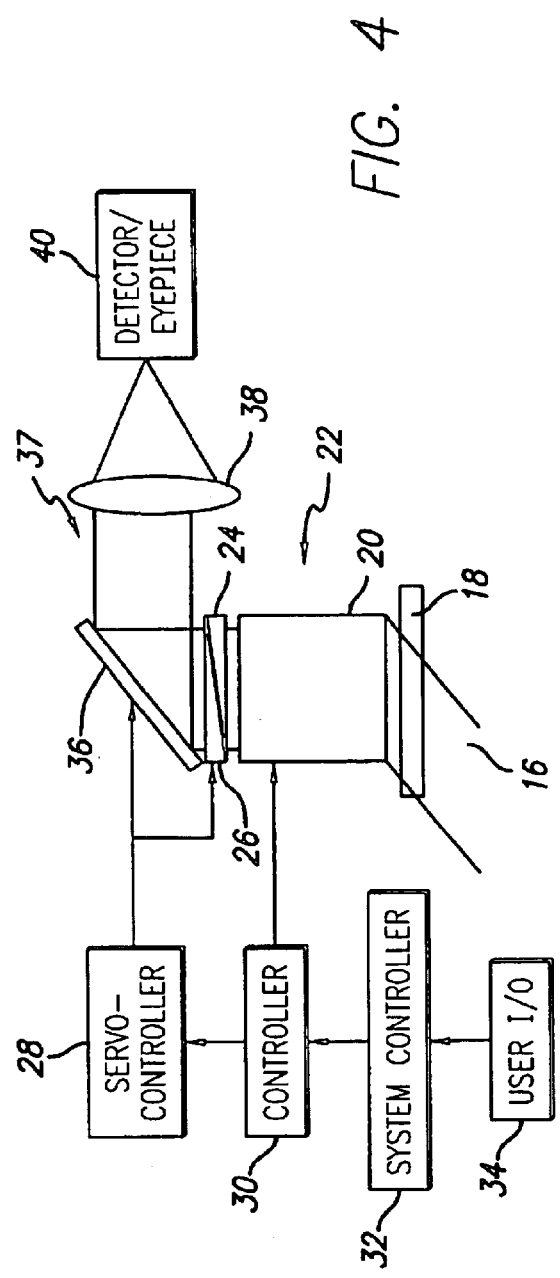
FIG. 3
FIG. 4

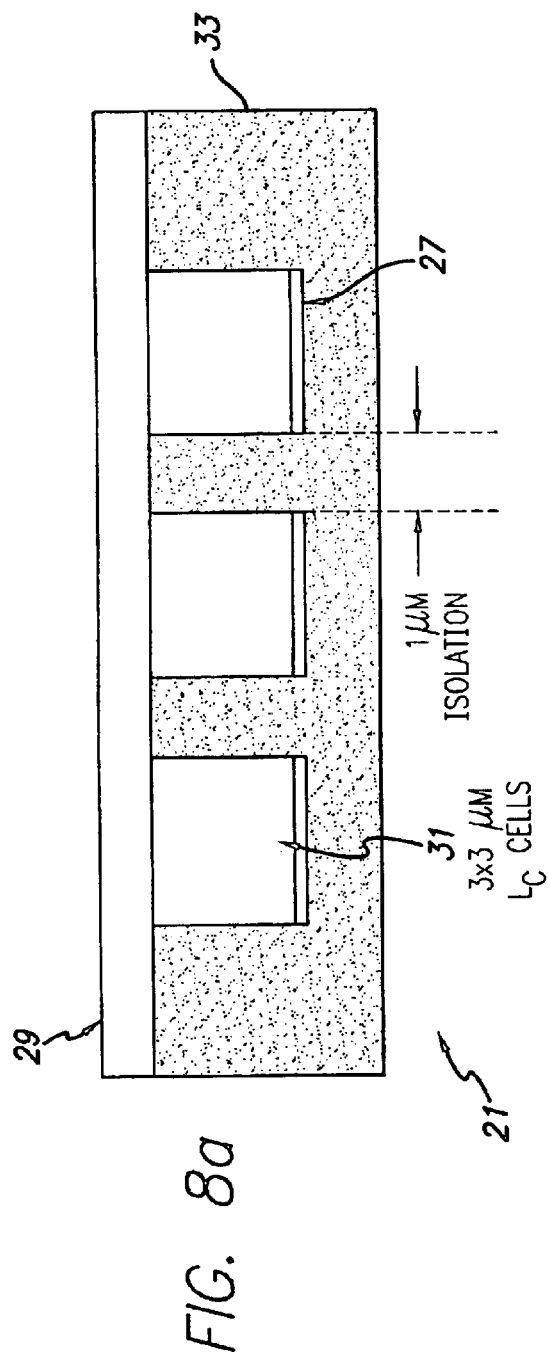
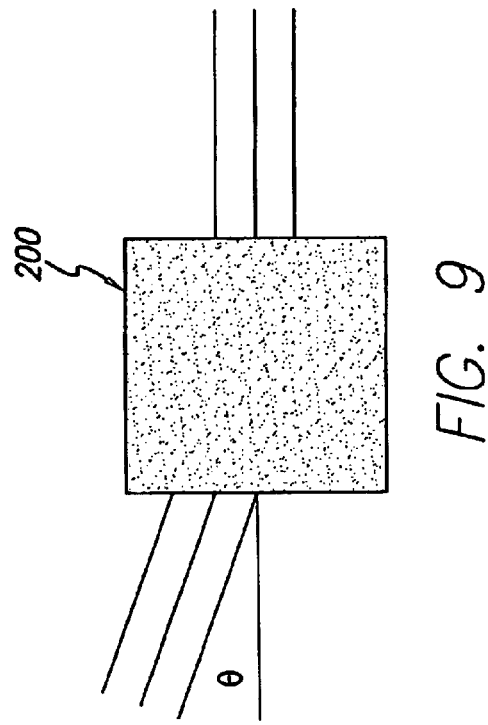
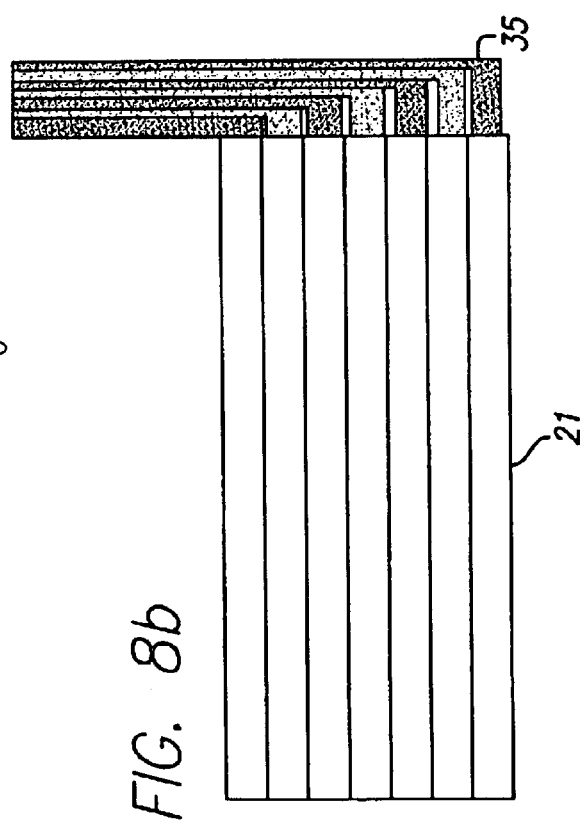
FIG. 8a
FIG. 8b
FIG. 9

BROADBAND OPTICAL BEAM STEERING SYSTEM AND METHOD

BACKGROUND OF THE INVENTION

1. Field of the Invention

The present invention relates to infrared and optical systems. More specifically, the present invention relates to systems and methods for effecting steering of infrared and optical beams.

2. Description of the Related Art

For many applications, there is a need to generate images optically. Military and commercial aircraft applications, for example, utilize systems which transmit and/or receive infrared, near-infrared, optical or other electromagnetic energy. The input and/or output beams must be steered in a desired pointing direction.

For beam steering, the prior art includes steering mirrors, pointing gimbals and monochromatic electro-optical, beam steering mechanisms. Steering mirrors require output windows many times the size of the system optical entrance pupil to scan over a large field of regard. Unfortunately, the mirror form factor requirements greatly increase the size of the sensor package.

The gimbaled approach involves use of an imaging system mounted in a dome that is gimbaled to provide a desired pointing angle. The gimbals must point the entire sensor to scan the field-of-regard. Unfortunately, for aircraft applications, this requires a mirror below the platform line, which necessitates a hole in the platform. In addition, the dome and optical assembly is bulky, typically requires considerable volume, and has a radar cross-section which tends to increases the observe-ability of the vehicle.

The monochromatic electro-optical, beam steering approach involves the use of a liquid crystal as the manipulated medium. This approach relies on a diffractive grating pattern in a liquid crystal array. Displacing the grating causes a phase delay that steers the beam. Unfortunately this approach only operates effectively for monochromatic or near-monochromatic light sources. For non-monochromatic light sources, this approach causes undesirable color dispersion.

Accordingly, a need exists in the art for small, compact optical scanning system with small aperture size requirements, wide field-of-regard and minimal color dispersion characteristics.

SUMMARY OF THE INVENTION

The need in the art is addressed by the beam steering system and method of the present invention. The invention provides a means for optical beam steering over a broad spectral band and over a wide field-of-regard in a small, compact optical scanning system with small aperture size requirements, wide field-of-regard and minimal color dispersion characteristics.

The inventive system includes a novel device for receiving an input wavefront of electromagnetic energy along a first axis and for refracting the input wavefront as an output wavefront along a second axis. The device is a unique form of a liquid crystal array which can be electrically manipulated to change the effective refractive index of each pixel. The index of refraction of the device varies in response to an applied voltage. The voltage is supplied by a microprocessor and/or a servo-control system. By changing the index, the incident phase front can be steered at an angle with respect to the first axis and otherwise manipulated according to the index variant pattern induced in the array. Accordingly, the output beam is steered in response to the applied voltage.

In the illustrative implementation, the device is an array of liquid crystal devices. Counter-rotating optical wedges are provided for restoring color balance to the output wavefront. In the illustrative embodiment, a mirror is included for compensating the wavefront output by said first and second counter-rotating optical wedges. The wavefront reflected by the mirror may be output by an imaging lens or other suitable device.

In accordance with the present teachings, beam steering is accomplished through a refractive variation not a diffractive one. This allows the spectral bandwidth to be much broader than for a diffractively manipulated phase wavefront.

BRIEF DESCRIPTION OF THE DRAWINGS

FIG. 3 is a diagram showing an illustrative application of the optical beam steering system of the present invention.

FIG. 4 is an isolated view of the optical beam steering system of the present invention with associated control circuitry.

FIG. 8a is an end view of multiple liquid crystal channels of the array of FIG. 5.

FIG. 8b is a sectional side view of multiple liquid crystal channels of the array of FIG. 5 showing an arrangement by which leads are brought out of the cells.

FIG. 9 is a diagram which illustrates that the beam steering device of the present invention may be used for multiple laser frequency steering.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
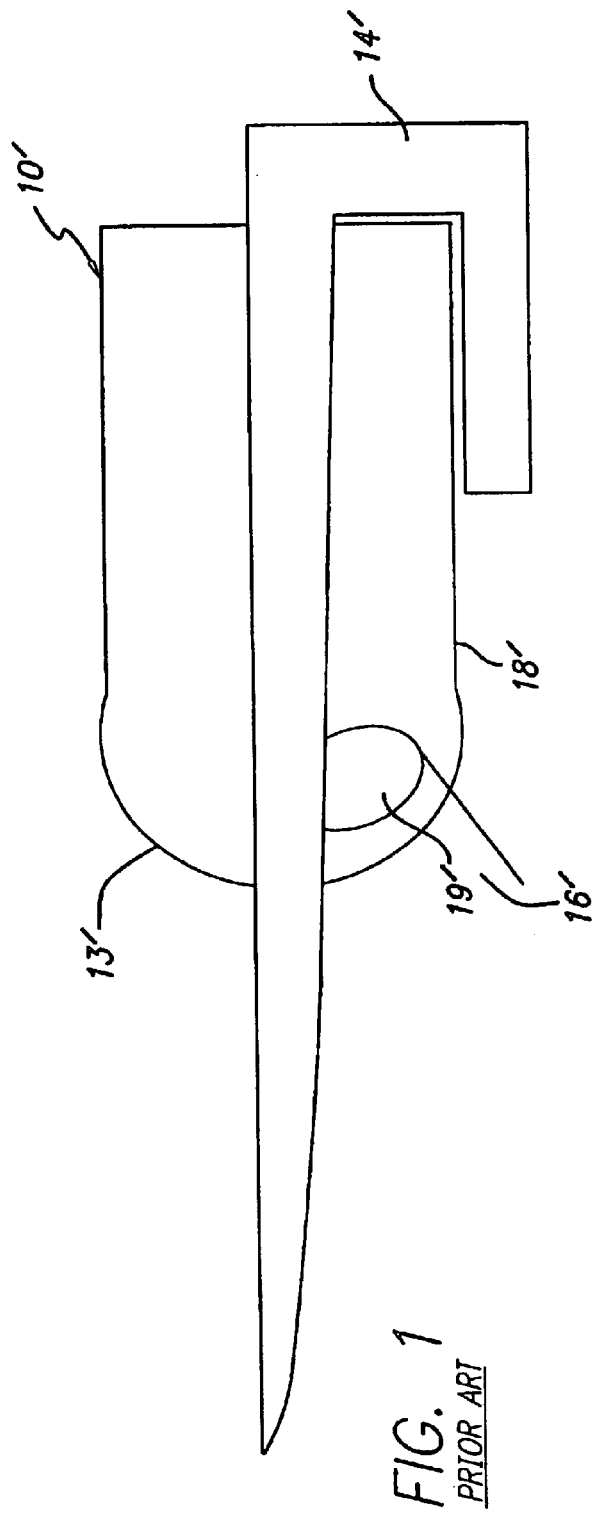
FIG. 1 is a diagram which illustrates an illustrative application a typical conventional gimbaled optical scanning system.

FIG. 1 is a diagram which illustrates an illustrative application of a typical conventional gimbaled optical scanning system. The conventional scanning system 10' includes a gimbaled mirror 12' (not shown in FIG. 1) mounted within a dome 13' gimbaled in an aircraft platform 14'. The mirror 12' scans a beam 16' through a window 18'.

Figure 2:
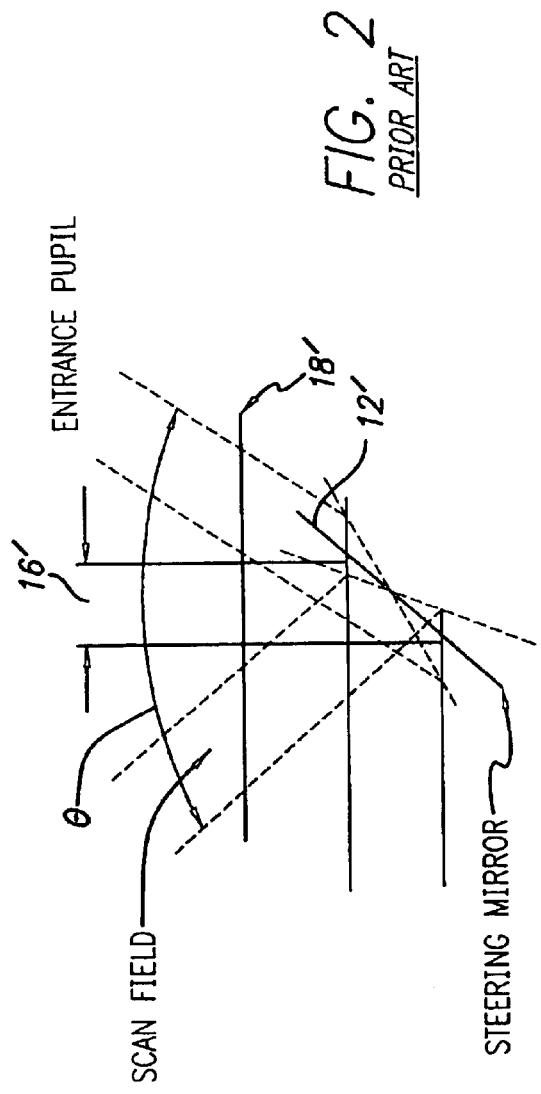
FIG. 2 is a diagram which illustrates the field-of-regard of the typical conventional gimbaled optical scanning system of FIG. 1.

FIG. 2 is a diagram which illustrates the field-of-regard of the typical conventional gimbaled optical scanning system of FIG. 1. As illustrated in FIG. 2, the gimbaled mirror 12' receives the beam 16' through an entrance pupil 19' over a field of regard θ. Clearly, as mentioned above, this use of steering mirrors requires an output window 18' many times the size of the system optical entrance pupil 16' to scan over a large field of regard θ. Unfortunately, for aircraft applications, this requires necessitates a large hole in the platform 14'. In addition, the dome 13'and associated optical assembly is bulky, typically requires considerable volume, and has a radar cross-section which tends to increases the observe-ability of the vehicle.

Hence, a need exists in the art for small, compact optical scanning system with small aperture size requirements, wide field-of-regard and minimal color dispersion characteristics.

FIG. 3 is a diagram showing an illustrative application of the optical beam steering system of the present invention. The beam steering system of the present invention 10 includes a device 20 which allows for electronic or electro-optical refractive steering of an input or output beam 16. As discussed more fully below, in the illustrative implementation, the device is a broadband liquid crystal array. The beam 16 is refracted through an window 18 which is approximately equal, in dimension, to the entrance pupil 19 of the device 20.

FIG. 4 is an isolated view of the optical beam steering system 10 of the present invention with associated control circuitry. As illustrated in FIG. 4, the refracted beam 16 is corrected for dispersion by a dispersion arrangement 22 consisting of first and second counter-rotating wedges 24 and 26. The diameter of the wedges 24 and 26 is determined by the diameter of the beam 16. The wedge angles are determined by the color dispersion inherent in the material in the device 20 through which the beam propagates for the spectral components of the beam.

The orientation of the wedges 24 and 26 is controlled by a servo-control system 28, which operates under command of a controller 30. The controller 30 may be implemented with a microprocessor, application specific integrated circuit, programmable digital logic circuit or other suitable circuit as will be appreciated by those of ordinary skill in the art. The controller may operate under command of a system controller 32, which would receive input from and provide output to a user via an interface 34.

As discussed more fully below, the controller 30 applies a voltage to the beam steering device 20, which determines the angle at which the beam is refractively steered thereby. Simultaneously, the controller supplies signals to the servo-controller 28 to make orientational adjustments to the wedges 24 and 26 required to correct for any color dispersion caused by the device 20.

The dispersion corrected beam is directed to a mirror 36. The mirror 36 is a component of a compensating group 37 which includes a lens 38. The mirror 36 compensates for any small angular change in the beam 16 caused by the dispersion group 22. As will be appreciated by those skilled in the art, the flatness and spectral reflectance of the mirror are primary design considerations. The mirror should be as flat as practical for the application. The spectral reflectance will be set by the reflective coatings selected for the application.

The lens serves to focus the beam 16 to a detector, camera or eyepiece 40.

Figure 5:
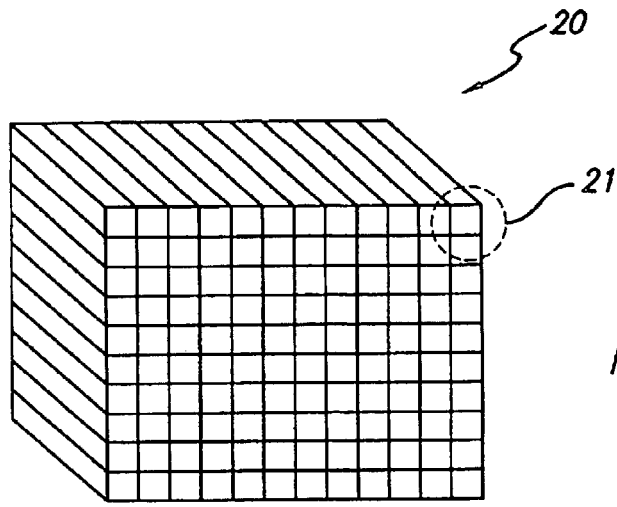
FIG. 5 is a diagram of the liquid crystal array utilized in the optical beam steering system of the present invention.

FIG. 5 is a diagram of the liquid crystal array 20 utilized in the optical beam steering system 10 of the present invention. As shown in FIG. 5, the broadband beaming steering device 20 consists of a multi-channel array of channels 21.

Figure 6:
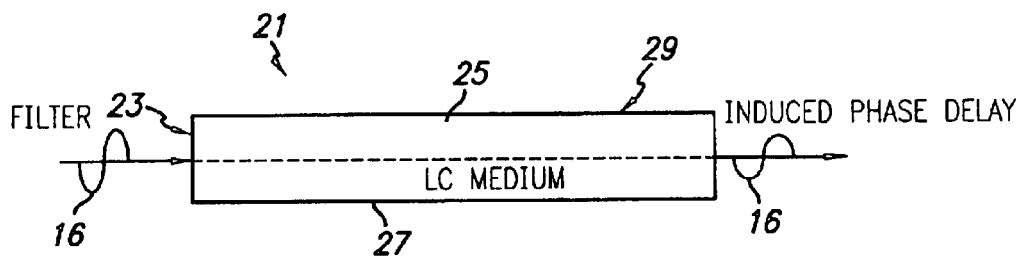
FIG. 6 is a sectional side view of a single liquid crystal channel of the array of FIG. 5.

FIG. 6 is a sectional side view of a single liquid crystal channel of the array 20 of FIG. 5. As depicted in FIG. 6, each channel 21 of the array 20 is filled with a liquid crystal formulation 25 and acts as a waveguide. Application of a voltage across each channel 21 induces a change in refractive index of the liquid crystal material. This introduces a phase delay in the beam 16 as it propagates through each channel.

Figure 7:
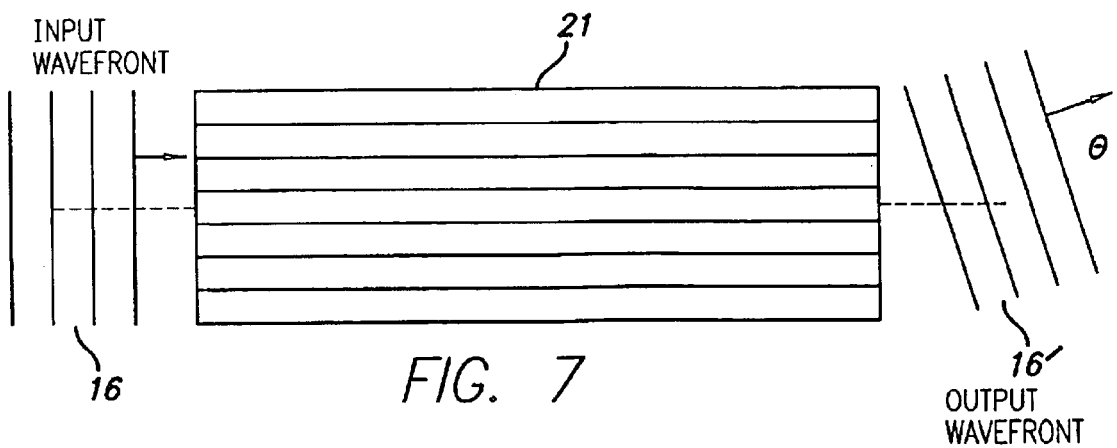
FIG. 7 is a sectional side view of multiple liquid crystal channels of the array of FIG. 5.

FIG. 7 is a sectional side view of multiple liquid crystal channels of the array 20 of FIG. 5. By varying the relative voltage channel-to-channel across the array, a variation between the channel indices is created. As depicted in FIG. 7, the variation between channel indices applies a phase delay across an incident optical wavefront 16 to create an electro-optical wedge. The optical wedge can be manipulated electro-optically to scan the field-of-regard. The optical wedge of the liquid crystal component is manipulated by varying the applied voltage. The rotating wedges correct the residual dispersive color that is inherent in any optical medium. This dispersive color correction is a small angular component compared to the large angular scan generated by the liquid crystal component.

FIG. 8a is a cross-sectional end view of multiple liquid crystal channels 21 of the array 20 of FIG. 5. As shown in FIG. 6 and 8a, each channel 21 is created by etching a cavity in a substrate 33 to create a cell 31. The cell size should be kept small to ensure single mode operation. In the illustrative embodiment, the cell thickness (channel length) is several centimeters and the operating temperature T=23° C. The substrate 33 may be any suitable etchable material. In the illustrative implementation, the cells are 3×3 microns and are separated with 1 micron of substrate.

A conductive material is flashed into the floor of the cell 31 to provide a ground 27. Next, in the illustrative implementation, the cell 31 is filled with a liquid crystal material to provide a medium 25. Those skilled in the art will appreciate that any material can be used as a medium so long as it refracts a beam of electromagnetic energy in response to an applied voltage. In the illustrative embodiment, a solution of 1% PTTP-15 dissolved in methylene chloride was chosen as the liquid crystal material for the medium 25. A voltage strip 29 of conductive material is applied as a cover for each cell. The voltage strip may be common in some embodiments. However, in most conservative embodiment, each cell has its own unique circuit and therefore, does not act as a common ground.

When a voltage is applied between the voltage strip 29 and the ground 27, a capacitive field is created therebetween. The field lines up the molecules of the medium and induces a rotation in the polarization of electromagnetic energy (e.g., light or infrared energy) propagating therethrough. Transmittance is maximized in the individual channel by creating either 1) total internal reflection by index cavity index selection or 2) by coating the interior with a reflective film.

A filter 23 is provided at the input aperture of each channel. An array (not shown) of conductors would be provided to allow for selective application of an applied voltage to an individual cell.

FIG. 8b is a sectional side view of multiple liquid crystal channels of the array of FIG. 5 showing an arrangement by which leads are brought out of the cells. Each row has a layered insulated wiring routing as shown. The dimensions are exaggerated to illustrate the path. Each of the row outputs are staggered in space to avoid physical interference when organized along the column.

FIG. 9 is a diagram which illustrates that the beam steering device of the present invention may be used for multiple laser frequency steering.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A system for steering a beam of electromagnetic energy comprising:

first means for receiving an input wavefront of electromagnetic energy along a first axis, said first means including means for refracting said input wavefront as an output wavefront along a second axis at an angle with respect to said first axis in response to an applied voltage;

second means for providing said voltage in response to a control signal;

third means for providing said control signal; and fourth means for correcting color dispersion in said output wavefront said means for correcting color dispersion including first and second counter-rotating optical wedges.

2. The invention of claim 1 wherein the index of refraction of said first means varies in response to said applied voltage.

3. The invention of claim 2 wherein said first means is a liquid crystal device.

4. The invention of claim 3 wherein said first means includes an array of liquid crystal devices.

5. The invention of claim 1 further including a mirror for compensating a wavefront output by said first and second counter-rotating optical wedges.

6. The invention of claim 5 further including an imaging lens in optical alignment with said mirror.

7. The invention of claim 1 wherein said third means is a microprocessor.

8. A system for steering a beam of electromagnetic energy comprising:

an array of liquid crystal devices for receiving an input wavefront of electromagnetic energy along a first axis and refracting said input wavefront as an output wavefront along a second axis at an angle with respect to said first axis in response to an applied voltage;

a microprocessor for providing said voltage;

first and second counter-rotating wedges, responsive to said microprocessor for processing said output wavefront;

a mirror, responsive to said microprocessor, for reflecting a wavefront output by said first and second counter-rotating optical wedges; and means for outputting an image reflected by said mirror.

9. The invention of claim 8 wherein the index of refraction of said array varies in response to said applied voltage.

10. A method for steering a beam of electromagnetic energy comprising the steps of:

providing a control signal;

providing a voltage in response to said control signal;

receiving an input wavefront of electromagnetic energy along a first axis and refracting said input wavefront as an output wavefront along a second axis at an angle with respect to said first axis in response to said voltage; and correcting color dispersion in said output wavefront with first and second counter-rotating optical wedges.

11. A method for steering multiple beams of electromagnetic energy comprising the steps of:

providing control signals;

providing a plurality of voltages in response to said control signals;

receiving multiple input wavefronts of electromagnetic energy along a first axis and refracting each said input wavefronts as an output wavefront along a second axis at angles with respect to said first axis in response to said voltages; and correcting color dispersion in said wavefronts with first and second counter-rotating optical wedges.

* * * * *